United States Patent [19]

Macholdt et al.

[11] Patent Number: 5,015,676
[45] Date of Patent: May 14, 1991

[54] PROCESS FOR ENHANCING THE ELECTROSTATIC CHARGEABILITY OF POWDER COATINGS OR POWDERS, AND THE USE THEREOF FOR SURFACE-COATING SOLID OBJECTS

[76] Inventors: Hans-Tobias Macholdt, Darmstadt; Alexander Sieber, Frankfurt am Main; Claus Godau, Kiedrich; Albrecht Manz, Wiesbaden, all of Fed. Rep. of Germany

[73] Assignee: Hoechst Aktiengegellschaft, Fed. Rep. of Germany

[21] Appl. No.: 266,508

[22] Filed: Nov. 3, 1988

[30] Foreign Application Priority Data

Nov. 5, 1987 [DE] Fed. Rep. of Germany ....... 3737493

[51] Int. Cl.$^5$ .............. C08K 5/3432; C08K 5/3415; C08K 5/29; C08K 5/19
[52] U.S. Cl. ................................. 523/453; 523/455; 523/456; 523/461; 524/104; 524/157; 524/159; 524/236; 524/238; 524/239; 524/240; 524/243; 524/244; 524/245; 524/246; 524/247
[58] Field of Search ............. 523/453, 461, 455, 456; 524/104, 718, 157, 159, 236, 238, 239, 240, 243, 244, 245, 246, 247

[56] References Cited

U.S. PATENT DOCUMENTS 3,845,016 10/1974 Labana et al. .................. 523/451
3,880,947 4/1975 Labana et al. .................. 523/451

FOREIGN PATENT DOCUMENTS 3600395 8/1987 Fed. Rep. of Germany .

OTHER PUBLICATIONS

F. Haselmeyer et al., Defazet, 27 529 (1973) ("Additive fuer EPS-Pulver").

Primary Examiner—Lewis T. Jacobs

[57] ABSTRACT

A process for enhancing the electrostatic chargeability of powder coatings or powders intended for surface-coating solid objects, by homogeneously incorporating at least one salt-like, cationic compound of the formulae (1) and/or (2)

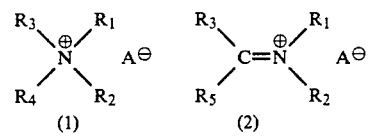

in which $R_1$, $R_2$, $R_3$ and $R_4$, independently of one another, are hydrogen atoms, straight-chain or branched alkyl groups having 1 to 30 carbon atoms, oxethyl groups of the formula $-(CH_2-CH_2-O)_n-R$ in which R is a hydrogen atom or a $(C_1-C_4)$alkyl or acyl group, and n is a number from 1 to 10, mononuclear or polynuclear cycloaliphatic radicals having 5 to 12 carbon atoms, mononuclear or polynuclear aromatic radicals or araliphatic radicals, $R_5$ denotes a hydrogen, fluorine, chlorine or bromine atom or a $(C_1-C_6)$alkoxy or primary amino group, and where $R_1$ and $R_3$ may be part of a ring system having 5 to 7 atoms and 0 to 3 double bonds, and $A^-$ denotes the equivalent of an anion, in an amount from about 0.01 to about 10 percent by weight into powder coatings or powders, where the salt-like cationic compounds of the general formulae (1) and (2) are dissolved or dispersed in the powder coating or powder.

8 Claims, No Drawings

PROCESS FOR ENHANCING THE ELECTROSTATIC CHARGEABILITY OF POWDER COATINGS OR POWDERS, AND THE USE THEREOF FOR SURFACE-COATING SOLID OBJECTS

DESCRIPTION

Process for enhancing the electrostatic chargeability of powder coatings or powders, and the use thereof for surface-coating solid objects.

The present invention relates to a process for enhancing the electrostatic chargeability of powder coatings or powders by homogeneously incorporating salt-like, cationic compounds of a certain structure into the powder coatings or powders, and to the use of the powder coatings or powders treated in this manner for surface-coating solid objects (workpieces).

Powder coating technology is used, inter alia, in the coating of small objects, such as garden furniture, camping articles, household appliances, small automotive parts, refrigerators and shelves, and in the coating of workpieces with a complicated shape. For the most part, metallic objects are coated, but it is also possible, for example, to coat plastics using powder coating technology. Compared with other coating methods, such as brushing, dipping and conventional spraying, powder coating technology has a number of advantages. For example, the coating method does not involve solvents and is thus environmentally friendly and less expensive.

The method is also advantageous with regard to disposal, industrial safety (absence of combustible solvents), industrial hygiene, environmental protection and the time taken for a coating operation.

Powder coating technology is based on the principle of electrostatic charging. The powder coating or powder generally receives its electrostatic charge by one of the two following methods:

(a) In the corona method, the powder coating or the powder is routed past a charged corona and charged.

(b) In the triboelectric or electrokinetic method, use is made of the principle of frictional electricity. In a spray gun, the powder coating or the powder is given an electrostatic charge which is opposite to the charge of the frictional partner, generally a tube or spray pipe (for example made of polytetrafluoroethylene).

It is also possible to combine the two methods.

Powder coating resins employed are typically epoxy resins, carboxyl- and hydroxyl-containing polyester resins and acrylic resins, together with the appropriate curing agents. Combinations of resins are also used. Thus, for example, epoxy resins are frequently employed in combination with carboxyl- and hydroxyl-containing polyester resins.

Typical curing components for epoxy resins are, for example acid anhydrides, imidazoles and dicyandiamide and derivatives thereof. The curing components for hydroxyl-containing polyester resins are typically, for example acid anhydrides, blocked isocyanates, bisacylurethanes, phenolic resins and melamine resins, and curing components for carboxyl-containing polyester resins are typically, for example, triglycidyl isocyanurates or epoxy resins. The curing components used in acrylic resins are typically, for example, oxazolines, isocyanates, triglyicidyl isocyanurates or dicarboxylic acids.

The method of charging the powder coatings or powders by frictional electricity has a number of advantages over the corona charging method. Thus, for example, the cost of producing and insulating the high voltage for operating the corona is superfluous, which increases, for example, the operational safety, in particular during hand operation.

In addition, it results in the spray guns becoming lighter, which is again important, above all, for hand spray guns.

Furthermore, powder paints which are electrostatically charged by means of friction have a more uniform charge and have less tendency towards back-spraying. ("Back-spraying" is taken to mean the effect whereby powder coating particles already adhering to the sprayed workpiece detach themselves from the latter again and spray off in all directions). In addition, the spray lances of the application equipment, which operate on the principle of frictional charging, can be extended by several meters without difficulties, moved closer to the article to be sprayed and thus also introduced into pipes or cavities.

In contrast, it is frequently a problem in powder coatings sprayed by the frictional charge method that the powder particles are insufficiently charged and produce poor throwing power on the sprayed workpiece. (The term "throwing power" is a measure of the extent to which a powder coating is also deposited on the rear, in cavities, in cracks and above all in the spraying shadow and on internal edges and in internal corners).

The problem of inadequate charging is observed, in particular, in powder coatings which have been prepared on the basis of polyester resins, in particular carboxyl-containing polyesters, or on the basis of so-called mixed powders. Mixed powders are taken to mean powder coatings whose resin base comprises a combination of an epoxy resin and a carboxyl-containing polyester resin. The mixed powders form the basis for the powder coatings most frequently encountered in practice.

Whereas powder coatings on a pure epoxy resin basis can still be triboelectrically sprayed relatively well, the method (triboelectric spraying) is generally unsatisfactory when mixed powders or powder coatings based on polyester resins are used. This means that the choice of resins for triboelectrically sprayed powder coatings is greatly limited. This is very unsatisfactory inasmuch as it is precisely by means of the resin base that a very wide variety of properties of a powder coating can be adjusted. For this reason, it is at present not possible to satisfy all applicational demands in all cases using triboelectrically sprayed powder coatings, which explains the fact that this advantageous method is still not very widespread.

There was therefore a demand for providing powder coatings or powders based on a very wide variety of resins, in particular triboelectrically sprayable powder coatings, with a higher and more uniform charge, and to achieve the highest and most uniform deposition rate possible on spraying the workpiece, the other properties of the powder coating, such as the mechanical properties and processability, being impaired as little as possible.

A known process for improving the electrostatic charging of triboelectrically sprayable powder coatings comprises adding aluminum oxide (F. Haselmeyer, K. Oehmichen, DEFAZET, Vol. 27, No. 11, 1973, page 529). In this procedure, the aluminum oxide is added to the finished powder coating before spraying, typically in concentrations between 1 and 5%. In this case, however, the material mentioned is not incorporated homogeneously into the powder coating, which results in difficulties, in particular, during continuous procedures.

If, on the other hand, the aluminum oxide is homogeneously incorporated (dispersed) into the powder coatings, it imparts its charge-increasing effect. The difficulties on adding aluminum oxide, for example, are that, in practice, the improvement in the electrostatic charge is only temporary. In addition, there are problems in mixing the powder coating and the additive uniformly, with separation of the powder coating and the additive and with abrasion in the charging zone.

A further attempt to improve the charging of triboelectrically sprayable powder coatings is described in German Offenlegungsschrift 3,600,395 A1. In this Offenlegungsschrift, the problem, known per se, of poor chargeability of triboelectrically sprayable powder coatings is likewise pointed out and, as a possible solution, the addition of capillary-active wetting agents based on quaternary ammonium compounds or the addition of, for example, metal-containing pigments, preferably zinc dust, is postulated only in a general manner.

Surprisingly, it has now been found that specific, salt-like, cationic compounds enhance the electrostatic chargeability of powder coatings and powders, in particular of triboelectrically sprayed powder coatings, if they are incorporated homogeneously. The higher electrostatic charging that this causes has, as a further positive effect, more uniform deposition of the sprayed powder coating or powder onto the coated object (workpiece) as a result.

The present invention therefore relates to a process for enhancing the electrostatic chargeability of powder coatings or powders intended for surface-coating solid objects (workpieces) by homogeneously incorporating at least one salt-like, cationic compound of the general formula (1) and/or (2)

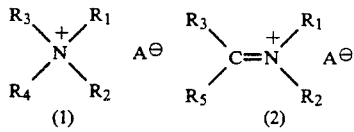

in which $R_1$, $R_2$, $R_3$ and $R_4$, independently of one another, denote hydrogen atoms, straight-chain or branched alkyl groups having 1 to 30 carbon atoms, preferably 1 to 22 carbon atoms, oxethyl groups of the general formula —$(CH_2$—$CH_2$—$O)_n$—R in which R is a hydrogen atom or a $(C_1$–$C_4)$alkyl group or an acyl group, such as, for example, the acetyl, benzoyl or naphthoyl group, and n is a number from 1 to 10, preferably 1 to 4, mononuclear or polynuclear cycloaliphatic radicals having 5 to 12 carbon atoms, such as, for example, cyclohexyl or cyclopentyl groups, mononuclear or polynuclear aromatic radicals, such as, for example, phenyl, 1-naphthyl, 2-naphthyl, tolyl or biphenyl radicals, or araliphatic radicals, such as, for example, the benzyl radical, where the aliphatic, araliphatic and aromatic radicals may be substituted by hydroxyl, $(C_1$–$C_4)$alkoxy groups, primary, secondary or tertiary amino groups, such as, for example, N-mono-$(C_1$–$C_4)$alkylamino or N-di$(C_1$–$C_4)$alkylamino groups, furthermore by acid amide groups, preferably phthalimide or naphthalimide groups, or by fluorine, chlorine or bromine atoms, and the aliphatic radicals can be substituted, in particular, by 1 to 33 fluorine atoms, $R_5$ denotes a hydrogen, fluorine, chlorine or bromine atom or a $(C_1$–$C_6)$alkyl, $(C_1$–$C_6)$-alkoxy or a primary amino group, and $A^{\ominus}$ denotes the equivalent of an anion, preferably of an organic anion, and the anionic radical here in turn preferably denotes the anionic radical of an aliphatic or aromatic carboxylic acid or sulfonic acid, and where $R_1$ and $R_3$ may be part or a ring system having 5 to 7 carbon atoms which may be interrupted by 1 or 2 heteroatoms, such as a nitrogen, oxygen or sulfur atom (pyridine and piperidine salts and derivatives thereof may be mentioned as examples of compounds of this type), and 0 to 3 double bonds, in an amount from about 0.01 to about 10 percent by weight, preferably 0.1 to about 5 % by weight, into the powder coatings or powders, and to the use of the powder coatings or powders treated in this way for surface-coating solid objects (workpieces) made of metal, wood, plastic, glass, ceramic, concrete, textile material, paper or rubber.

Particularly suitable salt-like, cationic compounds of the general formula (1) mentioned are those in which $R_1$, $R_2$, $R_3$ and $R_4$, independently of one another, denote hydrogen atoms, alkyl groups having 1 to 30 carbon atoms and benzyl groups, and $A^{\ominus}$ denotes the anionic radical of a phenolcarboxylic or phenolsulfonic acid, of a naphtholcarboxylic acid or naphtholsulfonic acid or of a derivative thereof, such as, for example, 1-hydroxynaphthyl-2-sulfonic acid, mono- and bishydroxynaphthylsulfonic acid, 2-hydroxynaphthyl-3-carboxylic acid, 2-hydroxynaphthyl-3-carboxylic acid, 1-aminonaphthyl-4-sulfonic acid, 4-methylphenyl-1-sulfonic acid or 2-hydroxynaphthyl-6carboxylic acid.

The following may be mentioned as examples of individual compounds of the general formula (1) or (2) mentioned with organic anions.

Benzyltri-n-butylammonium hydroxynaphthylsulfonate, benzyltri-n-butylammonium bishydroxynaphthylsulfonate, hexadecyltrimethylammonium 2-hydroxynaphthyl-3-carboxylate, cosyltrimethylammonium 2-hydroxynaphthyl-3-carboxylate, docosyltrimethylammonium 2-hydroxynaphthyl-3-carboxylate, benzyldi-n-butyl-n-propylammonium 1-aminonaphthyl-4-sulfonate, stearyldimethylphenethylammonium toluene-4-sulfonate, cetyltrimethylammonium salicylate, (3-phthalimidopropyl)-cetyldimethylammonium tosylate, (3-succinimidopropyl)-ethyldimethylammonium tosylate, (3-phthalimidopropyl)-cetyldimethylammonium tosylate, (3-phthalimidopropyl)-trimethylammonium methylsulfate, distearyldimethylammonium methylsulfate, pyridinium tosylate, and the quaternary ammonium compounds mentioned in their form as 2-hydroxynaphthyl-6-carboxylate or as 4-(3-hydroxy-2-naphthoylamino)-phenylsulfonate.

The compounds used according to the invention may be in dissolved or dispersed form in the powder coating or powder. Incorporation can take place in a manner known per se, for example by mixing and extruding or kneading the salt-like compound into the basic resin, for example polyester resin. The compounds employed according to the invention can be added as a dried and ground powder, as a dispersion or as a masterbatch, or in another suitable form or in solution. In principle, it is also possible to add the compound as early as during preparation of the particular powder (coating) resins, i.e. during the polymerization or polycondensation thereof. An advantage of the compounds according to the invention is that incorporation takes place without specifically developed powder recipes being necessary to this end, which would again limit the general applicability of the compounds mentioned; incorporation of the compounds comprises merely adding them during the operation selected for this purpose during powder (coating) production; an additional process step is not necessary.

The advantage of having the compounds according to the invention in dissolved or dispersed form in the powder coating or powder is that all the powder particles have enhanced electrostatic chargeability to the same extent, i.e. non-uniform effects cannot occur. Non-uniform effects due to the addition rates, inadequate mixing or due to separation are equally excluded.

The compounds used according to the invention can be employed in pigmented or non-pigmented (clear coating), colored or non-colored powder coatings or powder coating systems.

Since addition of the salt-like, cationic compounds to enhance the chargeability and to improve the throwing power and deposition rate must, on the other hand, impair the other mechanical properties and the processability as little as possible, i.e. the amount added should be as low as possible, it is of great advantage that the compounds used according to the invention are highly active products which represent a specific selection from the large classes of compounds comprising the quaternary ammonium and immonium compounds. Thus, for example, quaternary ammonium compounds, such as hexadecyltrimethylammonium chloride or distearyldimethylammonium chloride, which are able to improve the charging of powders, are not very suitable due to their physical consistency and processability. In order to render such compounds employable, they must, for example, be absorbed onto kieselguhr, which is again associated with corresponding expense (in this respect, see Example (10)). Furthermore, particularly suitable ammonium and immonium compounds are those whose water solubility at 20° C. is less than 2 g/l.

The powder coatings or powders containing the cationic compounds of the formulae (1) and/or (2) mentioned can be employed for coating, for example, metal, plastic, wood, ceramic, concrete, glass, textiles or paper.

It is of very particular advantage that the use of the compounds employed according to the invention in the powder coatings or powders, in particular in triboelectrically sprayable powder coatings, makes a relatively large choice of resins possible and opens up novel resin systems. Whereas essentially only powder coatings on a pure epoxy resin basis could hitherto be triboelectrically sprayed satisfactorily, it is now also possible to fall back on other resin systems. In particular, it is now possible to triboelectrically apply powder coatings based on polyester resins by using the compounds used according to the invention.

A further advantage of the use of the cationic compounds of the formulae (1) and/or (2) mentioned is the increased deposition rate of the powder coatings. This makes shorter spraying times possible, which is favorable in many regards, for example reduces costs. In combination with the enhanced chargeability and the improved throwing power, it is possible to achieve not only increased deposition of the sprayed powder coating on large areas, but also uniform coating in cavities, internal edges and corners and on the rear of the objects. The sprayed objects (workpieces) can thus be coated more uniformly. The powder coatings mentioned in the examples below are produced by extrusion and are comparable with one another with regard to the production process and the particle size distribution (mean particle size 50 $\mu$m). Tribospraying of the powders or powder coatings was carried out using the "Tribo Star" spray gun from Messrs. Intec (Dortmund) using a standard spraying pipe and star-shaped internal rod, at maximum powder throughput at a spraying pressure of 3 bar. The object to be sprayed, a multiedged metal cube (size about $5 \times 5 \times 5$ cm) was suspended in a spraying cabin and sprayed from a distance of 20 cm directly from the front without further movement of the spray gun. The charge of the sprayed powder in each case was measured using a "measuring instrument for measuring the triboelectric charge of powders" from Messrs. Intec (Dortmund). To carry out the measurements, the measurement antenna of the measuring instrument is held directly in the cloud of powder emerging from the spray gun. The current strength arising from the electrostatic charge of the powder coating or powder is indicated in $\mu$A. The throwing power and covering power were assessed visually. In particular, the extent to which rears, cavities, internal edges and corners and recesses behind edges were covered uniformly with surface coating was observed. Visual assessment is indicated in accordance with the DIN 53 230 evaluation scale 2.1 using scores from 0 to 5. On this scale, 0 is the best possible assessment and 5 the worst possible.

The examples below serve to illustrate the invention without representing a limitation. The parts indicated denote parts by weight.

EXAMPLE 1 (comparative example)

A powder coating of the composition

| ®Alftalat AN 721 | (carboxyl-containing polyester from HOECHST AG) | 259 parts |
| ®Beckopox EP 303 | (epoxy resin type 3 from HOECHST AG) | 111 parts |
| ®Alftalat 792 | (hydroxyl-containing polyester from HOECHST AG) | 200 parts |
| ®Kronos 2160 | (titanium dioxide from Kronos Titan GmbH) | 295 parts |
| Blanc Fixe F | (barium sulfate from Sachtleben Chemie GmbH) | 100 parts |
| ®Additol XL 496 | (flow-control agent from HOECHST AG) | 30 parts |
| Benzoin | | 5 parts |
| | | 1,000 parts | experiences an electrostatic charge corresponding to a current strength of 2.1 to 2.4 $\mu$A when sprayed triboelectrically using a star-shaped internal rod of length 38 cm.

Visual assessment of the sprayed workpiece (spraying duration 5 seconds) gave the score 4; the amount of powder deposited after 5 seconds was 1.1 g.

When a star-shaped internal rod of length 15 cm is used, the powder coating experiences a charge corresponding to a current strength of 0.6 to 0.7 $\mu$A when sprayed triboelectrically.

EXAMPLE 2

0.5 percent by weight of benzyltri-n-butylammonium monohydroxynaphthylsulfonate is incorporated homogeneously into a powder coating of the composition described in Example 1.

When sprayed triboelectrically using a star-shaped internal rod of length 38 cm, an electrostatic charge corresponding to a current strength of 3.1 to 3.4 μA is achieved.

Visual assessment of the sprayed workpiece (spraying duration 5 seconds) gave the score 3. The amount of powder deposited after 5 seconds was 1.5 g.

When a star-shaped internal rod of length 15 cm is used, the powder coating experiences a charge corresponding to a current strength of 0.7 to 0.8 μA when sprayed triboelectrically.

EXAMPLE 3

A powder coating of the composition described in Example 2, but containing 1 percent by weight, instead of 0.5 percent by weight, of the additive mentioned therein experiences an electrostatic charge corresponding to a current strength of 3.9 to 4.0 μA when sprayed triboelectrically using a star-shaped internal rod of length 38 cm.

Visual assessment of the sprayed workpiece (spraying duration 5 seconds) gave the score 2. The amount of powder deposited after 5 seconds was 1.6 g.

When a star-shaped internal rod of length 15 cm is used, the powder coating experiences a charge corresponding to a current strength of 0.8 to 0.9 μA when sprayed triboelectrically.

EXAMPLE 4

A powder coating of the composition described in Example 2, but containing 2 percent by weight, in place of 0.5 percent by weight, of the additive mentioned therein experiences an electrostatic charge corresponding to a current strength of 4.2 to 4.4 μA when sprayed triboelectrically using a star-shaped internal rod of length 38 cm.

Visual assessment of the sprayed workpiece (spraying duration 5 seconds) gave the score 1. The amount of powder deposited after 5 seconds was 1.6 g.

When a star-shaped internal rod of length 15 cm is used, the powder coating experiences a charge corresponding to a current strength of 1.0 to 1.1 μA when sprayed triboelectrically.

EXAMPLE 5 (comparative example)

A powder coating of the composition

| ® Alftalat AN 721 | (carboxyl-containing polyester from HOECHST AG) | 399 parts |
| --- | --- | --- |
| ® Beckopox EP 303 | (epoxy resin type 3 from HOECHST AG) | 171 parts |
| ® Kronos 2160 | (titanium dioxide from Kronos Titan GmbH) | 295 parts |
| Blanc Fixe F | (barium sulfate from Sachtleben Chemie GmbH) | 100 parts |
| ® Additol XL 496 | (flow-control agent from HOECHST AG) | 30 parts |
| Benzoin | | 5 parts |
| | | 1,000 parts | experiences an electrostatic charge corresponding to a current strength of 0.9 to 1.2 μA when sprayed triboelectrically using a star-shaped internal rod of length 38 cm.

Visual assessment of the sprayed workpiece (spraying duration 5 seconds) gave the score 4; the amount of powder deposited after 5 seconds was 1.4 g.

When a star-shaped internal rod of length 15 cm is used, the powder coating experiences a charge corresponding to a current strength of 0.3 to 0.4 μA when sprayed triboelectrically.

EXAMPLE 6

0.5 percent by weight of the additive described in Example 2 is incorporated homogeneously into a powder coating of the composition described in Example 5.

When sprayed triboelectrically using a star-shaped internal rod of length 38 cm, an electrostatic charge corresponding to a current strength of 1.3 to 1.4 μA is achieved.

Visual assessment of the sprayed workpiece (spraying duration 5 seconds) gave the score 3. The amount of powder deposit after 5 seconds was 1.4 g.

When a star-shaped internal rod of length 15 cm is used, the powder coating experiences a charge corresponding to a current strength of 0.9 μA when sprayed triboelectrically.

EXAMPLE 7

0.5 percent by weight of hexadecyltrimethylammonium 2-hydroxynaphthyl-3-carboxylate is incorporated homogeneously into a powder coating of the composition described in Example 5. When sprayed triboelectrically using a star-shaped internal rod of length 38 cm, an electrostatic charge corresponding to a current strength of 2.6 to 2.7 μA is achieved.

Visual assessment of the sprayed workpiece (spraying duration 5 seconds) gave the score 2. The amount of powder deposited after 5 seconds was 2.2 g.

The preparation of hexadecyltrimethylammonium 2-hydroxynaphthyl-3-carboxylate is described in EP 0,097,926 B1.

EXAMPLE 8

A powder coating of the composition described in Example 7, but containing 1 percent by weight, in place of 0.5 percent by weight, of the additive mentioned therein experiences an electrostatic charge corresponding to a current strength of 2.8 to 2.9 μA when sprayed tribo-electrically using the star-shaped internal rod of length 38 cm.

Visual assessment of the sprayed workpiece (spraying duration 5 seconds) gave the score 2. The amount of powder deposited after 5 seconds was 2.5 g.

EXAMPLE 9

A powder coating of the composition described in Example 7, but containing 2 percent by weight, in place of 0.5 percent by weight, of the additive mentioned therein experiences an electrostatic charge corresponding to a current strength of 2.8 to 2.9 μA when sprayed triboelectrically using a star-shaped internal rod of length 38 cm.

Visual assessment of the sprayed workpiece (spraying duration 5 seconds) gave the score 2. The amount of powder deposited after 5 seconds was 2.5 g.

EXAMPLE 10

2 percent by weight of an ammonium compound are incorporated homogeneously into a powder coating of the composition described in Example 5. The ammonium compound is hexadecyltrimethylammonium chloride. In order to render this compound suitable for processing for a powder coating, it is adsorbed 1:1 from an aqueous isopropanol solution (active compound content about 50 %) onto the silica ®Sipernat 22 (Messrs. DEGUSSA, see DEGUSSA company publication "Fallungskieselsäuren und Silikate, Herstellung, Eigenschaften und Anwendung" [Precipitation silicas and silicates, preparation, properties and use]). The ammonium salt/silica "inclusion compound" thus produced is added to the powder coating in the appropriate ratio.

When sprayed triboelectrically using a star-shaped internal 5 rod of length 38 cm, an electrostatic charge corresponding to a current strength of 1.8 to 2.0 μA is achieved.

Visual assessment of the sprayed workpiece (spraying duration 5 seconds) gave the score 3. The amount of powder deposited after 5 seconds was 1.4 g.

When a star-shaped internal rod of length 15 cm is used, the powder coating experiences a charge corresponding to a current density of 0.6 to 0.7 μA.

EXAMPLE 11 (comparative example)

A powder comprising pure styrene-methacrylic copolymer (®Dialec S 309 from Messrs. Diamond Shamrock) experiences 20 an electrostatic charge corresponding to a current strength of ±0 μA when sprayed triboelectrically both using a star-shaped internal rod of length 38 cm and using a star-shaped internal rod of length 15 cm.

EXAMPLE 12

1 percent by weight of the additive mentioned in Example 2 is incorporated homogeneously into a powder of the composition described in Example 11. When sprayed triboelectrically using a star-shaped internal rod of length 38 cm, an electrostatic charge corresponding to a current strength of 5.6 to 5.8 μA is achieved.

When a star-shaped internal rod of length 15 cm is used, the powder experiences a charge corresponding to a current strength of 2.6 to 2.8 μA when sprayed triboelectrically.

EXAMPLE 13

1 percent by weight of the additive mentioned in Example 7 is incorporated homogeneously into a powder of the composition described in Example 11. When sprayed triboelectrically using a star-shaped internal rod of length 38 cm, an electrostatic charge corresponding to a current strength of 7.9 to 8.2 μA is achieved.

When a star-shaped internal rod of length 15 cm is used, the powder experiences a charge corresponding to a current strength of 3.6 to 3.7 μA when sprayed triboelectrically.

EXAMPLE 14

1 percent by weight of an additive comprising about 80 parts of docosyltrimethylammonium salt and about 20 parts of cosyltrimethylammonium salt, each with 2-hydroxynaphthyl-carboxylate as the anion, is incorporated homogeneously into a powder of the composition described in Example 11. When sprayed triboelectrically using a star-shaped internal rod of length 38 cm, an electrostatic charge corresponding to a current strengh of 7.9 to 8.3 μA is achieved.

When a star-shaped internal rod of length 15 cm is used, the powder experiences a charge corresponding to a current strength of 4.2 to 4.3 μA when sprayed triboelectrically.

The preparation of the additive employed is described in EP 0,097,926 B1.

EXAMPLE 15

1 percent by weight of an additive essentially comprising n-octadecyltrimethylammonium with a molybdic acid anion as counterion is incorporated homogeneously into a powder as described in Example 11.

When sprayed triboelectrically using a star-shaped internal rod of length 38 cm, the powder experiences a charge corresponding to a current strength of 2.5 to 2.6 μA.

When a star-shaped internal rod of length 15 cm is used, the powder experiences a charge corresponding to a current strength of 0.4 to 0.5 μA when sprayed triboelectrically.

EXAMPLE 16

1 percent by weight of methyltrioctylammonium chloride is incorporated homogeneously into a powder as described in Example 11.

When sprayed triboelectrically using a star-shaped internal rod of length 38 cm, the powder experiences a charge corresponding to a current strength of 4.2 to 4.4 μA.

When a star-shaped internal rod of length 15 cm is used, the powder experiences a charge corresponding to a current strength of 3.2 to 3.4 μA when sprayed triboelectrically.

EXAMPLE 17

1 percent by weight of benzyltrimethylammonium chloride is incorporated homogeneously into a powder as described in Example 11.

When sprayed triboelectrically using a star-shaped internal rod of length 38 cm, the powder experiences a charge corresponding to a current strength of 3.0 to 3.1 μA.

EXAMPLE 18

1 percent by weight of tetrabutylammonium hydrogensulfate is incorporated homogeneously into a powder as described in Example 11.

When sprayed triboelectrically using a star-shaped internal rod of length 38 cm, the powder experiences a charge corresponding to a current strength of 5.2 to 5.4 μA.

When a star-shaped internal rod of length 15 cm is used, the powder experiences a charge corresponding to a current strength of 3.7 to 4.0 μA when sprayed triboelectrically.

We claim:

1. A process for enhancing the electrostatic chargeability of triboelectrically sprayable powdery coating compositions consisting essentially of (1) a hydroxyl- or carboxyl-containing polyester resin or (2) an acrylic resin or (3) a combination of a hydroxyl- or carboxyl-containing polyester resin and an epoxy resin, or combinations thereof, intended for surface-coating solid objects, which comprises homogeneously incorporating, by dissolving or dispersing into a said powder coating composition, at least one salt-like, cationic compound of the formulae (1) and/or (2)

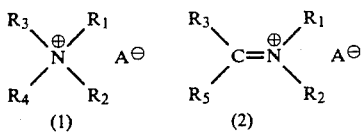

in which $R_1$, $R_2$, $R_3$ and $R_4$, independently of one another, denote hydrogen atoms, straight-chain or branched alkyl groups having 1 to 30 carbon atoms, oxethyl groups of the formula $-(CH_2-CH_2-O)_n-R$ in which R is a hydrogen atom or a $(C_1-C_4)$alkyl or acyl group and n is a number from 1 to 10, mononuclear or polynuclear cycloaliphatic radicals having 5 to 12 carbon atoms, mononuclear or polynuclear aromatic radicals or araliphatic radicals, $R_5$ denotes a hydrogen, fulorine, chlorine or bromine atom or a $(C_1-C_6)$alkyl, $(C_1-C_6)$alkoxy or primary amino group, and where $R_1$ and $R_3$ maybe part of a ring system having 5 to 7 atoms and 0 to 3 double bonds, and $A\theta$ denotes the equivalent of an anioni, radical of an organic compound in an amount from about 0.01 to about 10 percent by weight.

2. The process as claimed in claim 1, wherein, in the formula (1) mentioned therein, $R_1$, $R_2$, $R_3$ and $R_4$, independently of one another, denote hydrogen atoms, alkyl groups having 1 to 30 carbon atoms and benzyl groups.

3. The process as claimed in claim 1, wherein, in the formulae (1) and (2) mentioned in claim 1, $A\theta$ denotes the anionic radical of an aliphatic or aromatic carboxylic acid or sulfonic acid.

4. The process as claimed in claim 1, wherein the cationic compounds of the formulae (1) and (2) mentioned in claim 1 have a water solubility at 20° C. of less than 2.0 g/l.

5. The process as claimed in claim 1, wherein the cationic compounds of the formulae (1) and/or (2) mentioned in claim 1 are homogeneouly incorporated into the powder coating compositions in an amount from about 0.1 to about 5 percent by weight.

6. The process as claimed in claim 1, wherein the cationic compounds of the formulae (1) and/or (2) mentioned in claim 1 are homogeneously incorporated in the form of a dried and ground powder or in the form of a dispersion, a masterbatch or a solution into the powder coating compositions.

7. A triboelectrically sprayable, powder coating composition containing carboxyl-or hydroxyl-containing polyester resin or acrylic resin or an epoxy resin combined with a said polyester resin, or combinations thereof, and, homogeneously distributed, dissolved or dispersed in said resin or resins or combination of resins, about 0.01 to about 10% by weight of at least one salt-like cationic compound of the formulae (1) and/or (2)

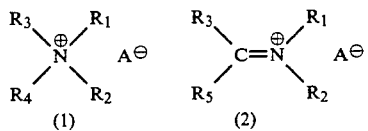

in which $R_1$, $R_2$, $R_3$ and $R_4$, independently of one another, denote hydrogen atoms, straight-chain or branched alkyl groups having 1 to 30 carbon atoms, oxethyl groups of the formula $-(CH_2-CH_2-))_n-R$ in which R is a hydrogen atom or a $C_1-C_4$)alkyl or acyl group and n is a number from 1 to 10, mononuclear or polynuclear cycloaliphatic radicals having 5 to 12 carbon atoms, mononuclear or polynuclear aromatic radicals or araliphatic radicals, $R_5$ denotes a hydrogen, fluorine, chlorine or bromine atom or a $(C_1-C_6)$alkyl, $(C_1-C_6)$alkoxy or primary amino group, and $A\theta$ denotes the equivalent of an anion of an organic compound.

8. The powder coating composition as claimed in claim 7, wherein said composition consists essentially of an acrylic resin and a said cationic compound of formulae (1) and/or (2).

* * * * *

UNITED STATES PATENT AND TRADEMARK OFFICE
CERTIFICATE OF CORRECTION

PATENT NO. : 5,015,676
DATED : May 14, 1991
INVENTOR(S) : Hans-Tobias, Alexander Sieber, Claus Godau and Albrecht Manz It is certified that error appears in the above-indentified patent and that said Letters Patent is hereby corrected as shown below:

In column 11, line 17, "fulorine" should read --fluorine--.

In column 11, line 21, "anioni," should read --anionic--.

In column 11, lines 20 and 29, "A$\theta$" should read --A$^\ominus$--.

In column 12, line 33, "A$\theta$" should read --A$^\ominus$--.

Signed and Sealed this

Twelfth Day of July, 1994

Attest:

BRUCE LEHMAN

*Attesting Officer*   Commissioner of Patents and Trademarks